United States Patent Office 2,724,680
Patented Nov. 22, 1955

2,724,680

PREPARATION AND RECOVERY OF α-KETOGLUTARIC ACID

Harold J. Koepsell and Frank H. Stodola, Peoria, and Eugene S. Sharpe, Eureka, Ill., assignors to the United States of America as represented by the Secretary of Agriculture No Drawing. Application March 11, 1952,
Serial No. 276,032

5 Claims. (Cl. 195—47)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the fermentation production of α-ketoglutaric acid, employing organisms of the genus Pseudomonas. It relates, more particularly, to an improvement on the process described in U. S. Patent No. 2,443,919 by Lockwood and Stodola and to improved methods for recovering α-ketoglutaric acid from the fermentation culture media.

According to the patent, glucose or other suitable carbohydrates, gluconate salts, or 2-ketogluconate salts are employed as starting materials in the submerged aerobic fermentation with Pseudomonas organisms to produce α-ketoglutaric acid. This prior process, as described in the patent specification, affords approximately 20 percent yields of the desired acid under optimum conditions.

The present invention relates, first to novel improved methods of fermentation which involve the use of special nutrient media; and second, to novel methods of recovery of the α-glutaric acid product from the culture media.

Various usual sources of assimilable carbon and assimilable nitrogen may be employed in the prior fermentation, and successful microbiological synthesis of α-ketoglutaric acid is achieved. However, we have discovered unusual differences in final result occur as these two sources vary in kind and amount. We have discovered, for example, that the kind of carbon source affects the results obtained, especially in the presence of certain kinds and amounts of nitrogen sources. These variables, when correlated within certain critical limits, as will be described in the following specification, make possible unusually large yields of the desired acid. The variables appear to bear a cooperative interrelationship of which our invention takes advantage, characterized by the suppression of unwanted byproducts and consistently doubled yields, compared with prior processes.

We have discovered that, provided glucose is used as the sole source of assimilable carbon, certain nitrogen sources give our increased yields if provided within the range of about 0.7 to 1.5 grams per liter of medium, calculated as urea. The source of nitrogen should be either an inorganic nitrogen compound, such as ammonium salts, inorganic nitrates or nitrites; or an organic nitrogen compound of simple molecular structure such as urea. The nitrogen source should be unassociated with proteinaceous material or other crude organic substances containing or consisting of vitamins or growth factors. In addition to these nutrients, we employ the usual proportion of calcium carbonate, potassium acid phosphate, and magnesium sulfate, as well as 1 to 3 p. p. m. of iron.

Our results are believed to be unusual in that our fermentations are carried out in the substantial absence of sources of vitamins and growth factors and further that the range of assimilable nitrogen source which characterizes our inventive process is considerably below that required for good vegetative growth of the Pseudomonas organisms. In fact, it is an isolated range bounded on each side by conditions which give unsatisfactory yields of the desired acid. These conditions result in abnormal metabolic phenomena which, under the particular conditions of our invention, appear to be especially adapted for the suppression of unwanted byproducts and the concomitant increase in yield of α-ketoglutaric acid.

Even though the nutrients supplied during our fermentation are unique, the general culture conditions are those which have been applied heretofore for the cultivation of Pseudomonas and other similar organisms. For example, our fermentations are carried out aerobically, preferably with agitation of the culture medium. The agitation may be effected by blowing air through the culture medium, by propellers, or by other means which will occur to those skilled in the art. The aeration may be effected by supplying an oxygen-containing gas, such as air, at atmospheric or superatmospheric pressure. The fermentation is conducted at temperatures between 15° C. and 40° C., preferably between 20° C. and 30° C.

At the end of the fermentation period which may be from 9 to 14 days, the culture medium contains relatively large quantities of undissolved calcium α-ketoglutarate formed by the interaction of the acid with the calcium carbonate present in the culture medium. Other solid material is also present, such as insoluble calcium compounds and the like.

The culture medium may be treated by known methods to recover the α-ketoglutaric acid. However, we have discovered an improved method of recovering α-ketoglutaric acid from these or similar fermentation media. According to known methods, the α-ketoglutaric acid is recovered as its calcium salt, as disclosed in the Lockwood patent previously mentioned. This prior method of recovery involves rather tedious centrifugation, extractions, and crystallizations.

According to our novel method of recovery, the solid material present in the culture medium is separated from the liquid of the medium in the form of a crude mixture containing the calcium α-ketoglutarate. The separation may be accomplished by centrifugation, filtering, or evaporation. We prefer the latter method, since the medium is of a rather thick consistency. The crude separated solid material is then acidified with concentrated mineral acid, such as hydrochloric, sulfuric, and the like. The acidification converts the calcium salt to free α-ketoglutaric acid. We prefer to carry out the acidification by making a thick paste of the solid material and the mineral acid.

We have discovered that α-ketoglutaric acid may be extracted selectively with relative facility from the acidified mixture. As extracting solvents, we may employ a water-immiscible organic solvent, such as ethyl acetate, methyl isopropyl ketone, butanol and the like. The desired α-ketoglutaric acid may be recovered from the extract by crystallization or evaporation. It may then be purified further in known manner as desired.

Any organic solvent for α-ketoglutaric acid which is immiscible with water and inert with respect to the α-ketoglutaric acid is operable in the process, since the mixture to be extracted consists essentially of bacterial cells, mineral salts, α-ketoglutaric acid and minor amounts of fermentation byproducts. Of these minor constituents, most are insoluble in organic solvents. Very small amounts of fermentation byproducts, such as pyruvic acid, may be extracted, but the amounts are negligible and do not interfere with final purification methods such as crystallization from the extracting solvent. The extraction thus effects a remarkable purification of the acidified heterogeneous crude separated solid material. For example, recovery by extraction, followed by evaporation of solvent to form the crystallized acid, yields consistently a product which has a melting point of 106° C. or higher.

Our novel method of recovery, as previously stated, is applicable to the recovery of α-ketoglutaric acid from other Pseudomonas culture media. However, it is particularly adaptable to the culture media as obtained by our improved culture method. Advantage is taken of the fact that our novel culture media are characterized by the suppression of unwanted byproducts of the Pseudomonas organism. For example, in our medium the formation of other acids formed by the oxidation of glucose or other carbohydrate is suppressed to a minimum.

The following specific examples illustrate the invention.

EXAMPLE 1

Fermentations to produce α-ketoglutaric acid were conducted in 1-liter Erlenmeyer flasks, each containing 200 ml. of synthetic medium and inoculated with *Pseudomonas fluorescens* NRRL B-6. The compositions of the media used are given in Table I below. The flasks, plugged with cotton, were shaken on a reciprocating shaker producing 90 three-inch strokes per minute, and the temperature was 27° C.

Progress of the fermentations was followed by analysis for reducing power by the method of Somogyi, J. Biol. Chem. 160, 61 (1945), which measured both residual glucose and the 2-ketogluconic acid produced as a transient intermediate compound. The fermentations were continued until the reducing power had diminished to zero. Alpha-ketoglutaric acid was measured by the method of Friedemann and Haugen, J. Biol. Chem. 147, 415 (1943). The results are shown in Table II.

Table I.—Synthetic medium for α-ketoglutaric acid production

| | Grams per liter |
|---|---|
| Glucose | 9 |
| Urea* | 0.75 to 1.5 |
| $KH_2PO_4$ | 1.1 |
| $MgSO_4$ | 0.24 |
| $CaCO_3$ | 37.5 |
| Fe[b] | p. p. m.. 1 |

* Ammonium sulfate was substituted for urea on an equimolar basis in some experiments without affecting yield.
[b] Supplied as ferrous ammonium sulfate.

Table II.—Yields of α-ketoglutaric acid

| Expt. No. | Fermentation time, hrs. | Yield, grams per 100 grams glucose supplied | |
|---|---|---|---|
| | | 2-ketogluconic acid | α-ketoglutaric acid |
| 151 | 307 | 0 | 44.6 |
| 152 | 386 | 0 | 39.7 |
| 154 | 310 | 1.6 | 42.2 |
| 157 | 384 | 0 | 39.1 |

EXAMPLE 2

The fermentations were conducted as described in Example 1. The medium contained, per liter, 91 g. glucose, 1.1 g. potassium dihydrogen phosphate, 0.35 g. nitrogen (supplied as urea), 0.24 g. magnesium sulfate, 37.5 g. calcium carbonate, sufficient ferrous ammonium sulfate to provide 1 part of iron per million. At 333 hrs. after inoculation, analysis of the fermentation liquor indicated that the culture contained 39.2 g. of α-ketoglutaric acid per liter.

A portion (266 ml.) of the whole culture, consisting of bacterial cells, residual calcium carbonate, precipitated and dissolved calcium α-ketoglutarate and other lesser products of fermentation, was dried in vacuo while frozen, yielding 28.2 g. of pale yellow powder. Fifteen ml. water and 15 ml. concentrated hydrochloric acid were added. Carbon dioxide gas was evolved. The resulting thick paste was below pH 2.0 and was extracted repeatedly with 75 ml. portions of ethyl acetate. Five ml. additional concentrated hydrochloric acid was added after the tenth extraction and four more extractions were made. Tests of the aqueous phase indicated that only about 0.5 to 1.0 percent of the original α-ketoglutaric acid remained unextracted.

Evaporation of the combined ethyl acetate extracts left a crystalline mass of crude α-ketoglutaric acid, M. P. 105°–107° C. (hot stage). This material was recrystallized from a mixture of ethyl acetate and petroleum ether, yielding the following fractions:

| Fraction No. | Weight, grams | Analysis | | Neutralization equivalent | M. P., °C. |
|---|---|---|---|---|---|
| | | Carbon, percent | Hydrogen, percent | | |
| 1 | 8.684 | 41.0 | 4.16 | 74 | 112–114 |
| 2 | 0.777 | 41.2 | 4.14 | 76 | 107–111 |
| 3 | 0.289 | 40.6 | 3.97 | 73 | 114–115 |
| Calc'd. for pure acid | | 41.1 | 4.14 | 73 | |

From the mother liquor could be obtained 792 mg. of α-ketoglutaric acid semicarbazone, M. P. 197°–198° C., equivalent to 570 mg. of α-ketoglutaric acid.

Calc'd. for $C_6H_9O_5N_3$: C, 35.5%; H, 4.47%; N, 20.7%. Found: C, 35.6%; H, 4.39%; N, 20.7%.

The total recovery of α-ketoglutaric acid therefore was 10.32 g., or 99.2 percent of the amount found by analysis.

EXAMPLE 3

A glucose fermentation by *Pseudomonas fluorescens* NRRL B-6 resulted in a thick slurry of calcium α-ketoglutarate, bacterial cells and excess calcium carbonate. The particulate solids were removed from the slurry by centrifuging and filtering, and the resulting cake was dried at 50° C. overnight; 226 g. of dry cake were obtained. One hundred fifty grams of the cake was suspended in 75 ml. of water and 105 ml. concentrated hydrochloric acid, resulting in the evolution of carbon dioxide. The resulting paste was extracted with 3000 ml. ethyl acetate in 450 ml. portions. The extracts were evaporated, yielding 81.5 g. of α-ketoglutaric acid, M. P. 106°–108° C.

We claim:

1. The process for producing α-ketoglutaric acid which comprises cultivating bacteria of the genus Pseudomonas under submerged aerobic conditions in a nutrient medium containing glucose as the sole carbohydrate, a neutralizing agent and a sole source of assimilable nitrogen in an amount within the range of about 0.7 to 1.5 g. per liter of medium, calculated as urea, said source of assimilable nitrogen being selected from the group consisting of inorganic nitrogen compounds of simple molecular structure, organic nitrogen compounds of simple molecular structure, and mixtures thereof, continuing the fermentation until substantial amounts of α-ketoglutaric acid are formed, and recovering said acid from the fermentation medium.

2. The method of claim 1 in which the neutralizing agent is calcium carbonate and in which α-ketoglutaric acid is recovered from the culture medium by separating the solid material including the calcium salt of α-ketoglutaric acid from the fermentation medium, treating the separated solids with mineral acid, and recovering α-ketoglutaric acid from the acidified solids by extraction with a water-immiscible organic solvent.

3. In a method for producing α-ketoglutaric acid by fermentation with Pseudomonas involving cultivating Pseudomonas bacteria in the presence of glucose as the sole carbohydrate, an assimilable nitrogen source in an amount within the range of about 0.7 to 1.5 g. per liter of medium, calculated as urea, and selected from the group consisting of inorganic nitrogen compounds of simple molecular structure, organic nitrogen compounds of simple molecular structure, and mixtures thereof, and essential mineral nutrients and subsequently recovering α-ketoglutaric acid values from the culture medium, the improvement which comprises separating the solid material from the finished fermentation medium, treating the separated solids with mineral acid, extracting the acidified solids with a water-immiscible organic solvent and recovering α-ketoglutaric acid values from the extract.

4. The process for producing α-ketoglutaric acid which comprises cultivating bacteria of the genus Pseudomonas under submerged aerobic conditions in a nutrient medium containing glucose as the sole carbohydrate, calcium carbonate, and urea in an amount within the range of about 0.7 to 1.5 g. per liter of medium, continuing the fermentation for a period of from 9 to 14 days, and recovering said acid from the fermentation medium.

5. The method of claim 4 in which the α-ketoglutaric acid is recovered from the culture medium by a method comprising separating the solid material including the calcium salt of α-ketoglutaric acid from the fermentation medium, treating the separated solids with mineral acid, extracting the acidified solids with ethyl acetate, and recovering α-ketoglutaric acid from the extract.

References Cited in the file of this patent

UNITED STATES PATENTS

| | | |
|---|---|---|
| 1,400,852 | Backhaus | Dec. 20, 1921 |
| 2,165,438 | Allquist | July 11, 1939 |
| 2,277,716 | Lockwood | Mar. 31, 1942 |
| 2,443,919 | Lockwood et al. | June 22, 1948 |

FOREIGN PATENTS

| | | |
|---|---|---|
| 553,944 | Great Britain | June 11, 1943 |